United States Patent [19]

Barla-Szabó et al.

[11] Patent Number: 4,602,716
[45] Date of Patent: Jul. 29, 1986

[54] PROCESS FOR DETERMINING THE SOUNDNESS OF SOWING SEEDS AND THEIR SOUNDNESS-DEPENDENT GERMINATIVE ABILITY, AND APPARATUS FOR CARRYING OUT THE PROCESS

[75] Inventors: Gábor Barla-Szabó; Béla Gyulay; Gábor Rajkai; Sarolta Deákné Karácsonyi; Pál Horváth, all of Budapest, Hungary

[73] Assignee: Licencia Talalmanyokat Ertekesito Vallalat, Hungary

[21] Appl. No.: 552,176

[22] PCT Filed: Feb. 23, 1982

[86] PCT No.: PCT/HU82/00005
§ 371 Date: Oct. 14, 1983
§ 102(e) Date: Oct. 14, 1983

[87] PCT Pub. No.: WO83/02872
PCT Pub. Date: Sep. 1, 1983

[51] Int. Cl.$^4$ ............................................. B07C 5/00
[52] U.S. Cl. .............................. 209/599; 73/432 PS; 209/590; 209/910
[58] Field of Search .............. 209/552, 576, 590, 599, 209/643, 908, 910; 73/12, 432 PS, 573, 861.73; 47/14, 16, DIG. 12; 381/56

[56] References Cited

U.S. PATENT DOCUMENTS

| | | | |
|---|---|---|---|
| 2,570,485 | 10/1951 | Rieber | 209/910 |
| 3,127,016 | 3/1964 | Baigent | 209/590 |
| 3,560,754 | 2/1971 | Kamentsky | 209/643 |
| 4,147,620 | 4/1979 | Artiano et al. | 209/590 |
| 4,212,398 | 7/1980 | Parker et al. | 209/590 |

Primary Examiner—Robert B. Reeves
Assistant Examiner—Donald T. Hajec
Attorney, Agent, or Firm—Handal & Morofsky

[57] ABSTRACT

A process for determining the soundness, and the soundness-dependent germinative ability of sowing seeds is based on detecting the characteristic difference between the acoustic excitation response functions of right and damaged seeds. The seeds are excited by their impinging on a hard surface and produce an acoustic signal and by examining the response functions a comparison is performed to decide whether the seeds are right or damaged. Apparatus for carrying out the process includes a feed tank (1), a seed feeding mechanism, a sensing chamber (4) and a vibration sensor (5) for detecting acoustic signals within the chamber (4), the output of the vibration sensor (5) being connected to a signal processing unit (6).

4 Claims, 3 Drawing Figures

PROCESS FOR DETERMINING THE SOUNDNESS OF SOWING SEEDS AND THEIR SOUNDNESS-DEPENDENT GERMINATIVE ABILITY, AND APPARATUS FOR CARRYING OUT THE PROCESS

FIELD OF THE INVENTION

This invention concerns a process for determining the soundness of sowing seeds and their soundness-dependent germinative ability, and apparatus for carrying out the process.

BACKGROUND OF THE INVENTION

The process according to the invention relates the determination of germinative ability of seeds to the examination of their soundness or integrity, with the latter also affording a possibility for classifying the seeds according to their germinative ability.

DESCRIPTION OF THE PRIOR ART

Means and processes are known for classifying and/or sorting of seeds according to their germinative ability wherein, in accordance with the laws of sampling of mathematical statistics the germinative ability of samples taken from a given quantity of seed is determined in percentage terms and from this value extrapolation or deduction is made to the germinative ability of the whole quantity of the seeds, expressed as a percentage. A common characteristic of these known means is that the seed samples tested cannot thereafter be utilized, bacause the testing is destructive. Such examination or test may, for instance, involve germination carried out between papers; experimental germination in the soil; and treatment with triphenyltetrazolium chloride to demonstrate the vitality of the seeds. A known process for demonstrating the germinative ability of pea seeds is to soak the seeds for 24 hours in de-ionized water and to measure change in electrical conductivity.

Common drawbacks of the known processes and means for destructively testing seeds include that the seeds tested may thereafter no longer be used, that results of the test become available only after a relatively long time, generally several days, and that in principle the processes are not suitable for continuous sorting.

Devices for performing seed classification according to germinative ability on the basis of certain physical characteristics of the seeds are known. A common characteristic of these devices is that they operate non-destructive testing processes. Such a device is, for instance, a sifter or screen to separate out shrivelled, dried up seeds. Seeds of excessively low density may be sorted out by e.g. known centrifugal separators. A known apparatus for separating seeds with injured hulls is the magnetic separator. For detecting larger surface blemishes and colour differences in the hull or skin of the seeds selective colour sorting devices are known.

A common drawback of known non-destructive seed selecting devices is that they all examine a given external physical characteristic of the seed and perform sorting on that basis. A decrease in the germinative ability of seeds may to a significant extent be caused by hairline cracks in the hull of the seed, by internal cavities formed in the seeds and by insect damage. These irregularities, which manifest themselves physically, cannot be shown up by devices which operate on non-destructive testing principles.

The known processes (germination) for classifying seeds and the corresponding devices or means have the advantage of reliability but have the disadvantage that they take a long time to perform the tests and that they destroy the seeds under test. For these reasons they are suitable only for a subsequent determination of the relative germinative ability, that is, they cannot be utilized directly in or integrated into the technological process of agriculture. Their use does not lead to seeds of improved relative germinating power.

The advantage of known devices which classify on the basis of external physical characteristics is the fact that they are non-destructive and that they can be integrated into a given technological process, while their disadvantage is that the process is not sufficiently reliable because it fails to take into account a number of important factors, as explained above.

SUMMARY OF THE INVENTION

An aim of the invention is to provide a non-destructive process and apparatus for determining the soundness or integrity of seeds and the ascertain their germinative ability on that basis, wherein a result may be produced in a time shorter than in germination tests and the reliability of which is considerably greater than that of known non-destructive processes.

In elaborating the invention, the starting point was the experimentally verified fact that a reduction in the germinative ability of genetically healthy seeds is caused by mechanical faults. We have recognized that the differing mechanical characteristics of healthy (undamaged) and faulty (impaired) seeds may most readily be determined by a process of vibration analysis. Each individual seed may be regarded as a complex mechanical system. To excite this oscillatory system the frequency response function of a characteristic of the oscillation or vibration, expediently its velocity, is examined. The excitation time function may for instance be sinusoidal, pulse-type, a step function type etc. Since the dimensions of the seeds are smaller by several orders of magnitude than the wavelength of the vibrational wave propagating in them, they may be regarded as a lumped-constant mechanical oscillating system. The spatial dependence of the characteristics of oscillation may be neglected relative to the time dependence. From the point of view of vibration analysis a seed can be regarded as a system comprising masses which are interconnected by mechanical springs and loss resistances. The mechanical loss resistances are used to take into account the viscoelastic friction and the internal structural friction of the material of the seed. For faulty seeds the value of the lumped-constant mechanical elements change and the topology of the whole mechanical network is changed.

In the process according to the invention the seeds under test are excited acoustically or by mechanical vibration by their own fall and the characteristics of the acoustic and/or mechanical response formed in this way are examined and on that basis is determined whether the seed or seeds under test are of satisfactory integrity or soundness. For this determination, in a previous operation and in a known manner, the characteristic response function of the healthy seeds is established and the separation is performed on the basis of the characteristic differences found in the response functions.

To sort large-sized seeds (e.g., maize or corn, peas, beans and wheat) of a weight exceeding 50 g per 1000 seeds according to their germinative ability, a process is provided according to the invention wherein the seeds are individually dropped in an acoustically closed space from a predetermined height on a hard plate and the frequency distribution of the acoustic signal of the seed obtained on impact is analysed by a spectrum analyser. Since the respective distribution curves of healthy and damaged seeds differ significantly from each other, the selection is performed on this basis. The acoustic or vibration signal of the seed is different from an acoustic signal of the plate which is produced by the hard base plate on impact.

The apparatus according to the invention includes a feeder unit for individually feeding the seeds to an examination chamber, in which examination chamber take place the mechanical excitation of the seed and the detection or sensing of the response function, and also a signal processing system which evaluates the response function and controls a separating and storing unit. This latter serves to separate and temporarily store the seeds which have been classified as right and faulty, respectively.

The invention is suitable for the large-scale sorting of seeds and according to our experience its use affords an improvement of 5% to 30% depending on the initial percentage germinative ability. Naturally, for seeds with an initially high percentage of germinative ability the improvement is smaller than for seeds which are initially of a lower germinative ability. Thus, for instance, a quantity of seed with 80% germinative ability is increased to 90% while that initially at 60% to 80%.

Naturally, seeds classified as faulty or damaged may still be used, e.g. for fodder or industrial or other uses. Seeds of 100% germinating power cannot be achieved even with the apparatus according to the invention because the germinative ability of seeds does not solely depend on their mechanical characteristics.

BRIEF DESCRIPTION OF THE DRAWINGS

The invention is further described by reference to examples and is illustrated in greater detail in the accompanying drawings wherein.

DESCRIPTION OF THE PREFERRED EMBODIMENTS

Figure 1:
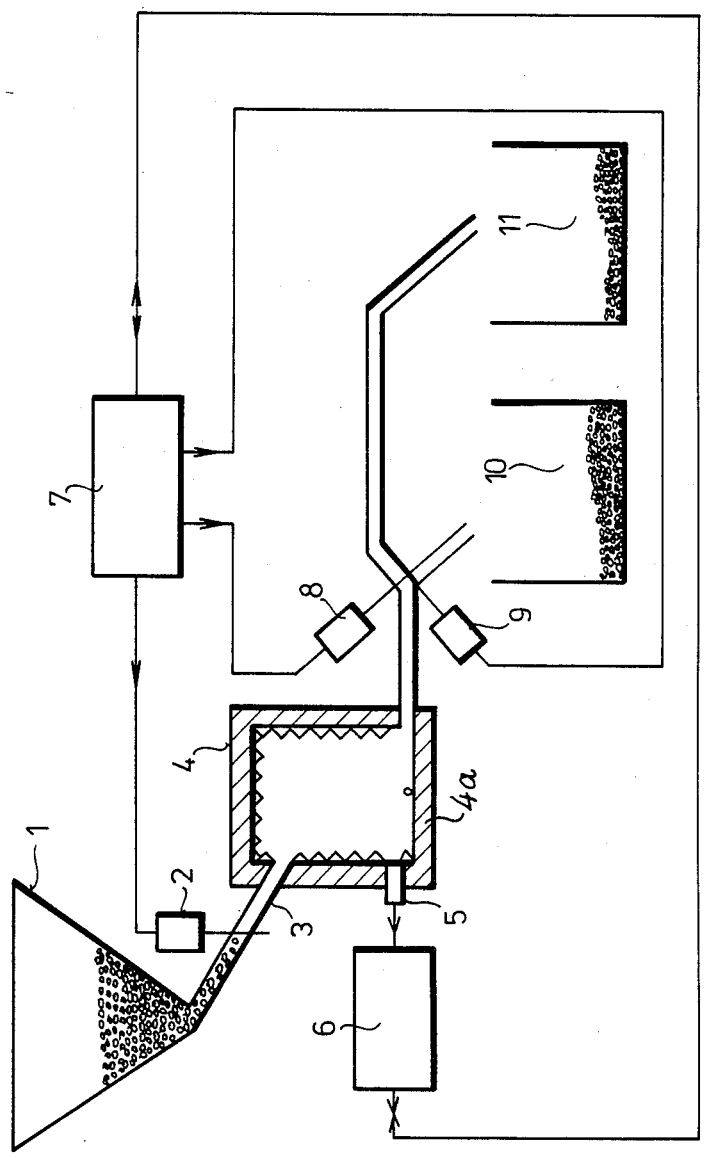
FIG. 1 is a diagrammatic view of apparatus suitable for sorting large-size seeds in accordance with their germinating power.

FIG. 1 shows an example of a preferred embodiment of apparatus according to the invention suitable for classifying large-sized sowing seeds according to their germinative ability.

The apparatus has a feed hopper 1 which is connected via a feed duct 3 interruptable by a feed valve 2 to the upper part of a sensing chamber 4. The mechanical excitation of each seed is expediently provided by the impact of its own fall. This excitation can be regarded as an impulse function and the response function is to a good approximation a function of the weight. The bottom 4a of the sensing chamber 4 is expediently a hard, smoothsurfaced copper or marble plate of at least 15 mm thickness. The chamber is sound-insulated to exclude external disturbing noises. With the exception of the hard base plate 4a, internal wall of the chamber is covered with a sound-absorbing material to obviate cavity resonances. A mechanical vibration sensor, expediently an acceleration sensor, or a microphone 5 is built into the wall of the chamber.

A signal processing unit 6 performs the amplification of the signal from the sensor and performs a signal analysis in the frequency range of 20–2000 Hz with a resolution of a band-width of at least ⅓ of an octave. The actual spectrum is compared with the average spectrum of seeds classified as right and the result of the comparison is passed to a control unit 7. The signal processing unit 6 and the control unit 7 are expediently both digital and the analog signal of the sensor is converted to a digital signal by an analog-todigital (A/D) converter, not shown. If as a result of the comparison of spectra the seed is classified as right, then the control unit 7 opens a valve 8 and the seed is discharged, e.g. with the aid of a pneumatic suctionblowing system, to a temporary storage vessel 11. If on the other hand the seed is classified as faulty, then a valve 9 is opened and the seed is passed to a temporary storage vessel 10. Then the control unit 7 opens the interruptor valve 2 and a new seed is passed into the examination chamber.

Accordingly, with the aid of the apparatus according to the invention the seeds are individually passed into the sensing chamber 4 and the signal processing unit 6 connected to the microphone 5 receives a gated signal from the control unit 7 which 'enables' the signal processing only for the anticipated duration of the fall of the seed.

In the experimental examination of peas and beans the following circumstances were set up:

(a) height of drop: 150 mm;

(b) the drop took place onto a steel sheet of 200×200×18 mm;

(c) the condenser-type measuring microphone was placed directly above and perpendicularly to the steel sheet;

(d) the analysis was performed with a bank of digital filters having a constant relative band-width of ⅓ octave;

(e) the mean mass of the peas: 205 g/1000 pieces;

(f) the mean mass of beans: 394 g/1000 pieces.

With the aid of the apparatus arranged in this way the rate of sorting is reflected in the following data:

The dropping of the seeds took place at intervals of 200 ms. The time of fall is 170 ms, the microphone signal was gated, the time of gate 'opening' was 10 ms and the removal (suction) time of the seeds was 20 ms. 5 seeds per second were permitted to pass through the or each channel of the apparatus.

Figure 2:
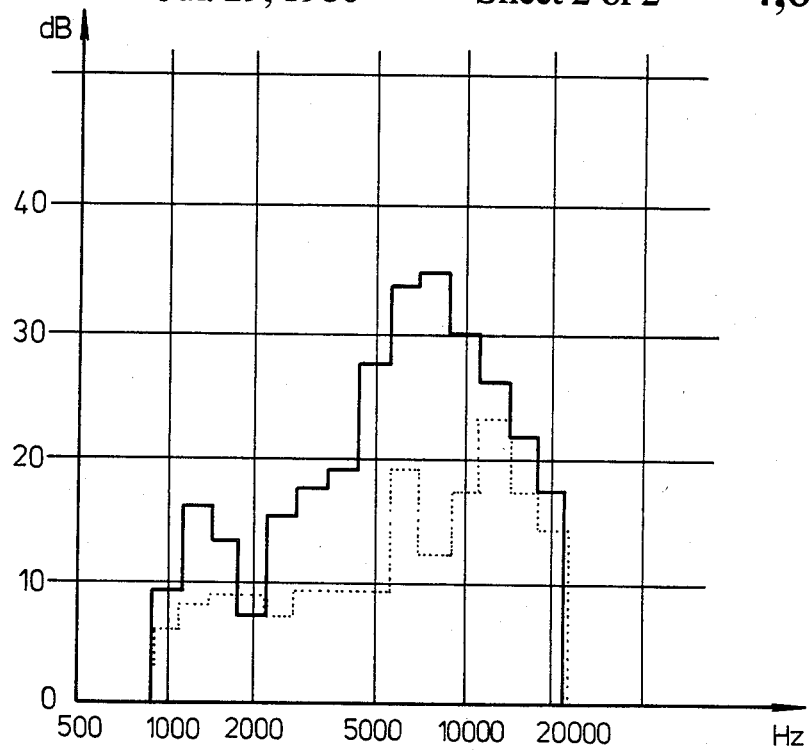
FIG. 2 is a graph of the spectral distribution of the acoustic response signal obtained by the apparatus according to FIG. 1 in the examination of healthy (dotted lines) and faulty (full lines) pea seeds.
Figure 3:
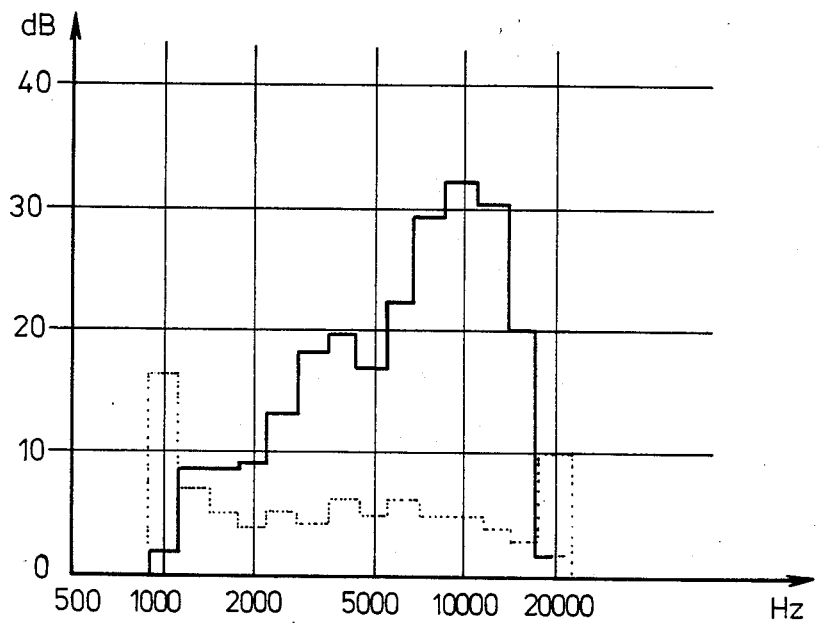
FIG. 3 is a graph showing the spectral distribution of the acoustic response signal obtained with the apparatus according to FIG. 1 in the examination of healthy (dotted lines) and faulty (full lines) beans.

By way of example FIG. 2 shows the specific spectra of a healthy and a damaged pea seed and in FIG. 3 the corresponding spectra for bean seeds is shown.

By way of example the statistical results of sorting 100 pea seeds and 50 bean seeds utilizing the process according to the invention is described below:

The circumstances of the test were as described above.

PEAS

Tested quantity: 100 pieces.

After sorting the 100 seeds were germinated between papers and the percentage germinative ability of the whole quantity was 85%.

Classification on the basis of spectrum analysis found 58% of the seeds right and their germinative ability was 95%. The germinative ability of the other 42% of the seeds which were adjudged to be damaged was 71%. Thus, by using the sorting process according to the invention from the seeds of originally 85% germinating power seeds were obtained with a germinating power of 95%.

BEANS

Examined quantity: 50 pieces.

The germination test gave 54% germinative ability for the whole quantity. After sorting 32% of the seeds were classified as healthy, with a germinative ability of 69%. 68% of the seeds were found to be damaged and their germinative ability was 47%. From the original seeds of 54% germinative ability seeds with a germinative ability of 69% was obtained by the sorting process.

The sorting and classifying process according to the invention may be used not only for examining the response signals of drops and for the individual examination of large-sized sowing seeds.

Should it be necessary to examine the germinative ability of small seeds, then a suitable embodiment of the process according to the invention seeds of a predetermined weight or mass are acoustically excited together and the total response is analysed. Thus, for instance, the value of the absorption factor obtained on ultrasonic excitation varies very significantly for a seed 'composition' or assembly of varying individual germinative ability expressed as percentages and from the value of the absorption factor conclusions or extrapolations may be made as to the percentage germinating factor that may be expected of the quantity under test.

Similarly, there is a close correlation between the ability of the seeds to germinate and the acoustic (mechanical) resonance. On this basis the germinating power may also be examined by placing the seeds on a vibratory deck and vibrating them at a frequency which is in the vicinity of the natural resonance frequency of the healthy seeds. The upward movement of the seeds will depend on the interval between their resonance frequency and the frequency of the excitation. Since this interval is greater in the case of injured or damaged seeds of reduced germinative ability, the amplitude of oscillation of injured seeds will be appreciably smaller than the amplitude of oscillation of healthy seeds.

We claim:

1. A comparative process for determining the soundness of sowing seeds and their soundness-based germinative ability comprising the dropping of the seeds by gravity toward a hard surface and causing their acoustic excitation and production of a seed acoustic signal different from an impact acoustic signal produced by the hard surface on impact, sensing and analyzing the distribution of the spectrum of the acoustic signal of the seeds, and comparing said spectrum distribution with previously obtained spectrum distribution of seeds which were acoustically excited in the same way and which were known to be undamaged and damaged, respectively.

2. A process according to claim 1 characterised in that the seeds are sorted according to their soundness in dependence on the result of the said comparison.

3. Apparatus for determining the soundness of sowing seeds and their soundness-based germinative ability, comprising a seed storage and feeding vessel, a mechanism for individually advancing and feeding seeds from the vessel and a closed sensing chamber provided with a hard base plate, said mechanism being connected to the upper region of said chamber for delivering seed thereto, a vibration sensor operatively connected with the interior of the sensing chamber for sensing a vibration signal of the seeds resulting from the seeds impacting on said hard base plate, said vibration signal being different from an impact acoustic signal produced by the hard base plate on impact; and a signal processing unit connected to the output of the vibration sensor for analyzing said vibration signal of the seeds, wherein the signal processing unit contains a spectrum analyzer comprising an output connected to a control unit for controlling an interruptor valve placed in a duct for discharging the seeds from the sensing chamber.

4. Apparatus according to claim 3, wherein said mechanism comprises a feed valve; said apparatus also including a further interruptor valve, said interrupter valves each having a discharge path, and temporary storage tanks adjacent each said path; said further valve having a control input connected in the discharge duct of the seeds, said control input also being connected to the control unit; each of the discharge paths of said two interruptor valves delivering the seeds to said temporary storage tanks.

* * * * *